United States Patent [19]

Manabe

[11] Patent Number: 5,473,393
[45] Date of Patent: Dec. 5, 1995

[54] ILLUMINATING SYSTEM, PROJECTION APPARATUS AND DETECTING APPARATUS

[75] Inventor: Yuji Manabe, Kamakura, Japan

[73] Assignee: Nikon Corporation, Tokyo, Japan

[21] Appl. No.: 341,128

[22] Filed: Nov. 18, 1994

[30] Foreign Application Priority Data

Dec. 9, 1993 [JP] Japan .................... 5-340413

[51] Int. Cl.$^6$ .................... G03B 21/28
[52] U.S. Cl. .................... 353/38; 353/97
[58] Field of Search .................... 353/38, 37, 97, 353/98, 102; 359/40, 48, 49

[56] References Cited

U.S. PATENT DOCUMENTS

| | | | |
|---|---|---|---|
| 3,704,936 | 12/1972 | Gorkiewicz et al. | 350/161 |
| 4,389,096 | 6/1983 | Hori et al. | 350/339 |
| 4,619,508 | 10/1986 | Shibuya et al. | 353/38 |
| 5,098,184 | 3/1992 | van den Brandt et al. | 353/38 |
| 5,245,369 | 9/1993 | Um et al. | 353/37 |
| 5,379,135 | 1/1995 | Nakagaki et al. | 359/40 |
| 5,381,197 | 1/1995 | Yoshida et al. | 353/37 |

FOREIGN PATENT DOCUMENTS 60-41538   12/1985   Japan .

Primary Examiner—William A. Cuchlinski, Jr.
Assistant Examiner—William C. Dowling
Attorney, Agent, or Firm—Shapiro and Shapiro

[57] ABSTRACT

Disclosed are a projection apparatus, an illuminating system and a detecting apparatus with the illuminating system. The projection apparatus includes a light valve, a light source, a fly's eye lens disposed in light beams from the light source, a relay optical system, having an optical axis parallel to a normal line of the light valve, for guiding the light beams emerging from the fly's eye lens to the light valve, an imaging optical system through which the light valve is conjugate to a screen and an optical path split element for guiding the light beams from the light source to the reflection type light valve and, at the same time, guiding reflected light beams from the light valve to the imaging optical system. The illuminating system includes a light source, a fly's eye lens having lens elements, an optical path split element having a light split surface disposed in focal positions of the lens elements and a relay optical system. The detecting apparatus with an illuminating system includes a light source, a fly's eye lens having lens elements, an optical path split element having a light split surface disposed in focal positions of the lens elements, a relay optical system and a detector.

19 Claims, 8 Drawing Sheets

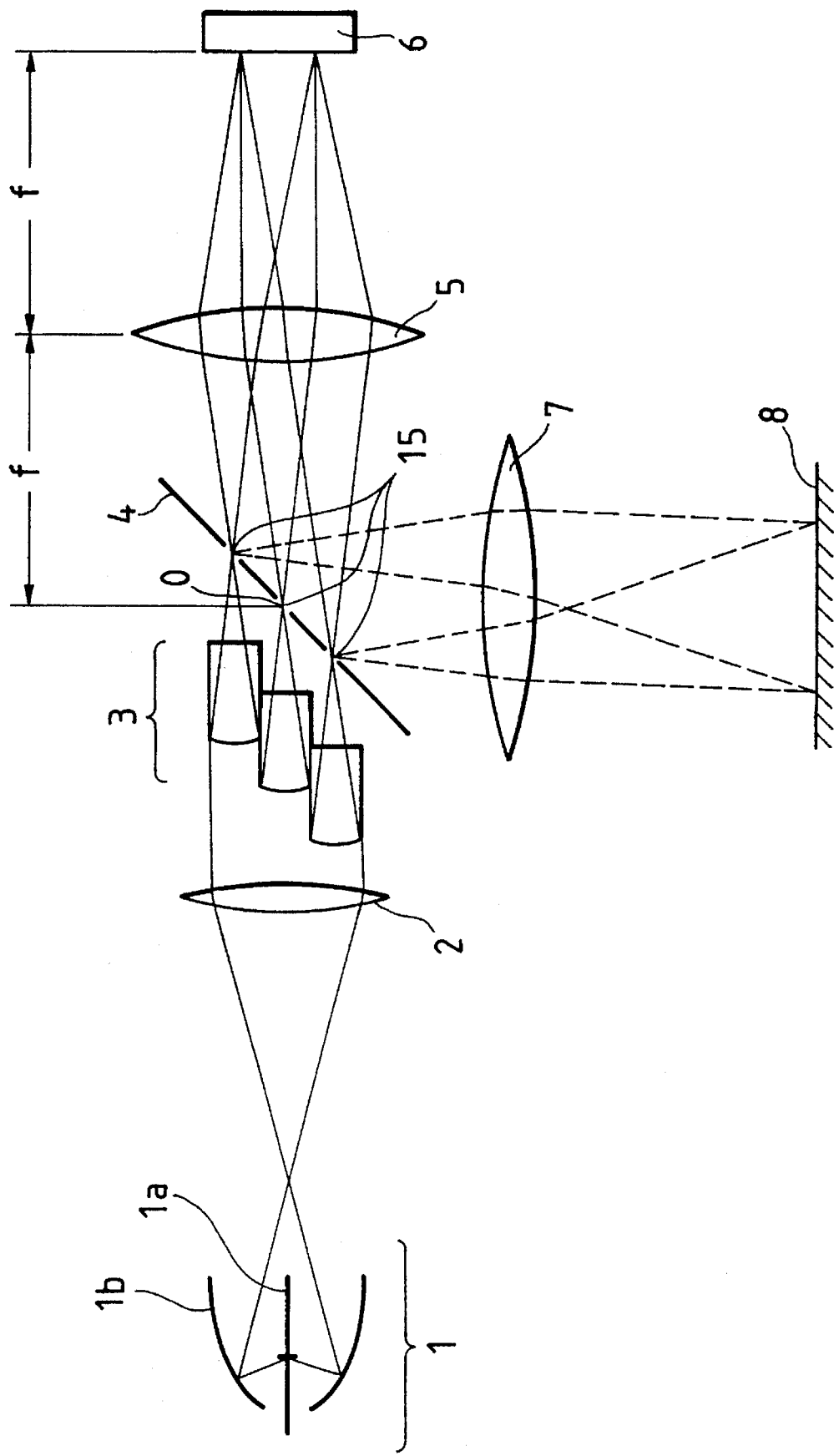

ILLUMINATING SYSTEM, PROJECTION APPARATUS AND DETECTING APPARATUS

BACKGROUND OF THE INVENTION

1. Field of the Invention

The present invention relates generally to an illuminating system using a fly's eye lens and, more particularly, to an illuminating system suitable for a liquid crystal video projector. The present invention also relates to a projection apparatus employing this illuminating system and to a detecting apparatus using the illuminating system.

2. Related Background Art

In general, a liquid crystal video projector is exemplified as an apparatus for projecting a video image on a large screen. The liquid crystal video projector is roughly classified into a phase modulation type in which a polarizing optical system is combined with a double refraction property of the liquid crystal's own and a scatter type in which a Schlieren optical system is combined with the liquid crystal assuming a light scattering property as in the case of a polymer dispersion type liquid crystal.

Herein, FIG. 1 illustrates one example of the latter type, i.e., a conventional dispersion type liquid crystal video projector in which the Schlieren optical system is combined with the liquid crystal exhibiting the light scattering property. Referring to FIG. 1, beams of illumination light emitted from a light source 91 are substantially collimated by a condenser lens 92 and, thereafter, fall on a reflecting surface of a light valve 96.

The light beams reflected by the light valve 96 are guided to a projection optical system. At this time, however, a space modulation concurrently takes place on the light valve 96. For example, a portion for partially scatter-reflecting the light beams falling on the light valve 96 is formed by a method such as deforming a surface of an oil film or metal film by use of an electronic element. When the irradiation light beams are reflected therefrom, the space modulation is effected by generating direct reflection light and scatter reflection light. Then, an image is formed by selecting the direct reflection light or the scatter reflection light from the light valve 96, thereby projecting on-the-light-valve video data.

In the example of the prior art shown in FIG. 1, the light beams direct-reflected from the light valve 96 are condensed by a condenser lens 910 and, thereafter, eliminated as unnecessary light beams by a light absorbing member 911. The light beams partially scatter-reflected from the light valve 96 are converged by a projection lens 87 and projected on a screen 98.

As described above, the illumination light beams with which the light valve 96 is irradiated from the illumination optical system constructed of the light source 91 and the condenser lens 92, etc. are space-modulated on the light valve 96 and thereafter guided to the projection optical system composed of the projection lens 97, etc. The light beams are then projected on the screen 98.

In the conventional projection apparatus described above, an illuminance of the irradiation light beams in each intrasection area thereof is not uniform depending on the light source of the illumination optical system. Consequently, it may happen that an ununiformity in terms of luminance on the screen is produced in a projected image projected based thereon. For this reason, it can be considered that a fly's eye lens is used as a method of uniformizing the illuminance of the illumination light beams.

This fly's eye lens is a combination of a multiplicity of lens elements as illustrated in FIG. 2. The illuminance of the illumination light beams can be uniformized by incorporating this fly's eye lens into the illumination optical system.

FIG. 2 illustrates one example of a layout of the typical illumination optical system using the fly's eye lens. Referring to FIG. 2, a light source 81 consisting of a lamp 81a and an elliptical mirror 81b and an irradiated surface 89 are disposed in a face-to-face relationship with each other. The light beams emitted from the light source 81 are substantially collimated by a condenser lens 82 and thereafter incident on a fly's eye lens 83.

The light beams incident on the fly's eye lens 83 are split and converged by its respective lens elements and thereafter incident on a relay lens 85 while being dispersed. The same area on the irradiated surface 89 is irradiated with the respective light beams through the relay lens 85. Accordingly, this irradiated surface 89 is irradiated with the light beams with an uniform intensity.

If the projection apparatus can be combined with the fly's eye lens as shown in FIG. 2, a problem in terms of the ununiform luminance of the projected image can be obviated. This fly's eye lens does not generally, however, exhibit an uniformizing effect unless the optical axis of the light beams incident on the fly's eye lens is orthogonal to the irradiated surface and the incident surface of the fly's eye lens.

Hence, the uniformizing effect of the intensity of the illumination light beams can not be expected simply by incorporating the fly's eye lens into the illumination optical system of the scatter type projection apparatus constructed so that the optical axes of the two optical systems are spatially tilted to the light valve.

Another method of solving the problem of the ununiformity of the intensity of this projected image, it can be also considered, entails uniformizing the intensity of the illumination light beams by performing an optical path synthesizing/splitting process with the aid of a half-mirror instead of the fly's eye lens. According to such a method, however, there is caused a loss of light quantity due to half-transmitting (reflecting) light via the half-mirror, and hence there arises a problem in which the light quantity of a video data image that is finally projected decreases on the whole.

Further, the irradiation light beams are space-modulated into the scattered reflection light and the direct reflection light on the light valve, and, therefore, the direct reflection light exhibiting a higher illuminance is eliminated as unnecessary light beams (the scattered reflection light is selected and projected). Consequently, there also exists such a problem that the quantity of the light projected on the screen is reduced on the whole, resulting a darker projected image.

As discussed above, in the conventional scatter type projection apparatus employing the Schlieren optical system, if the partial ununiformity of the illuminance appears in the illumination light beams from the light source, the unevenness in terms of the luminance is easy to occur in the projected image. When effecting the optical path synthesizing/splitting process to obviate this luminance ununiformity, the problem is that the light quantity of the finally projected video data image decreases on the whole.

Under such circumstances, there is proposed a method (Japanese Utility Model Publication No. 60-41538) of making use of the direct reflection light to increase the light quantity of the finally projected video data image. Based on this method of making use of the direct reflection light, however, the uniformizing effect of the intensity of the illumination light beams can not be expected.

Further, it is required that such a scatter type projection apparatus be constructed to cause no interference between the illumination optical system and the projection optical system. Accordingly, it is a general configuration that the optical axes of the two optical systems are, as in the conventional example shown in FIG. 1, spatially tilted to the light valve. Using such an oblique incident (reflecting) light beam entails a problem in which the image projected on the screen is resultantly distorted.

This image distortion can be obviated by shifting the projection optical system. According to this method, however, a projection optical system's demand performance needed for shifting the projection optical system becomes more strict, which in turn induces another problem of leading to an increase in costs.

Also, in the case of employing the fly's eye lens as depicted in FIG. 2, the projected image is to be distorted based on the configuration wherein the optical axes of the two optical systems are spatially tilted to the light valve.

Moreover, in the example also which is disclosed in Japanese Utility Model Publication No. 60-41538 given above, the distortion of the projected image still remains unobviated.

SUMMARY OF THE INVENTION

It is a primary object of the present invention to increase a light quantity in a state where an ununiformity of illuminance of illumination light is restrained. It is a secondary object thereof to obtain a bright projected image by preventing an ununiformity of luminance of the projected image.

It is another object of the present invention to provide a projection apparatus in which a distortion is not produced in the projected image.

To accomplish the above objects, according to one aspect of the present invention, there is provided a projection apparatus comprising: a reflection type light valve; a light source; a fly's eye lens disposed in light beams from the light source; a relay optical system, having an optical axis parallel to a normal line of the reflection type light valve, for guiding the light beams emerging from the fly's eye lens to the reflection type light valve; an imaging optical system through which the reflection type light valve is conjugate to a screen; and an optical path split element for guiding the light beams from the light source to the reflection type light valve and, guiding reflected light beams from the reflection type light valve to the imaging optical system.

Further, to accomplish the above objects, according to another aspect of the present invention, there is provided a projection apparatus comprising: a light source; a fly's eye lens; a relay optical system; an optical path split element; a reflection type light valve; and an imaging optical system, wherein the relay optical system is disposed so that a normal line of the reflection type light valve is parallel to an optical axis of the relay optical system, the reflection type light valve and a screen are conjugate with respect to the imaging optical system, and light beams from the light source travel through the fly's eye lens, the optical path split element and the relay optical system and also, after being reflected by the reflection type light valve, travel through the relay optical system, the optical path split element and the imaging optical system.

To accomplish the above objects, according to still another aspect of the present invention, there is provided a projection apparatus comprising: a reflection type light valve; a light source; a fly's eye lens disposed in light beams from the light source; a relay optical system having an optical axis parallel to a normal line of the reflection type light valve, for guiding the light beams emerging from the fly's eye lens to the reflection type light valve; and an imaging optical system through which the reflection type light valve is conjugate to a screen.

The invention of the present application is constructed as described above and therefore exhibits the following action. First, in an illuminating system according to the present invention, a fly's eye lens and a relay optical system for guiding light beams from the fly's eye lens to a reflecting surface of an illuminated object (reflection type light valve) are provided in an optical path formed by an illumination optical system including a light source. Therefore, the illumination light beams are guided to the illuminated object (reflection type light valve) after being uniformized so as not to produce an intensity distribution and an intensity ununiformity of the illumination light beams from the light source.

Accordingly, the light beams emitted from the light source are, even when having the intensity ununiformity and the intensity distribution within the section of the light beams, are changed by the fly's eye lens into light beams exhibiting a uniform illuminance distribution and then fall on the illuminated object (reflection type light valve). It is therefore possible to prevent an occurrence of the luminance ununiformity of the projected image formed of the reflected light therefrom.

Herein, a relay optical system incorporated into the above illumination optical system is disposed so that a normal line of the illuminated object (reflection type light valve) is parallel to an optical axis of the relay optical system. The arrangement is such that the reflecting surface of the light valve is irradiated orthogonally with the illumination light beams, and the reflected light travels along a backward path of the illumination light.

Then, the projection apparatus according to this invention includes an optical path split element, whereby an illumination-side optical path and a projection-side optical path are split. The illumination light beams are guided via the optical path split element to the reflection type light valve, and, at the same time, the reflected light from the reflection type light valve is guided via the optical path split element to an imaging optical system.

As explained above, the projection apparatus according to the present invention has the optical path split element, and, therefore, optical axes of the optical paths of the illumination optical system and of the projection optical system are respectively orthogonal to the reflection type light valve. With this configuration, video data formed on a display surface of the reflection type light valve is projected exactly on a screen bearing a face-to-face relationship with the display surface of the reflection type light valve. A projected image with no distortion is thereby obtained.

Furthermore, the projection apparatus according to this invention includes the optical path split element, and the illumination light is vertically incident on the reflection light valve, and, at the same time, the reflected light is also taken out in the vertical direction. This therefore yields such an advantage that a spatial arrangement of the respective optical paths can be simplified. A layout of the individual members is facilitated when designing the apparatus, and, in addition, an adjustment when manufactured is also facilitated. A workability when designed and manufactured as well is improved.

Herein, the optical path split element in the projection apparatus is constructed in such a way that the light beams from the illumination optical system are, after being reflected, fall orthogonally on the reflection type light valve, and, at the same time, the light beams reflected by the reflection type light valve penetrate unchanged and are guided to the imaging element, thus projecting the light beams on the screen. When constructed in this way, the reflection type light valve (reflecting surface) may be disposed orthogonally to a projecting direction (orthogonal to the screen surface).

Reversely, the optical path split element may be constructed such that the light beams orthogonally fall on the reflection type light valve without changing the optical path of the illumination optical system, and, simultaneously, the light beams reflected by the reflection type light valve are, after being reflected, projected on the screen.

Then, for splitting the optical path by the optical path split element in this way, the optical split element exhibiting the following action may suffice. The light split surface may be so disposed as to be tilted to the common optical path. The light split surface transmits, after the illumination has been reflected, the reflected light or reversely reflects, after transmitting the illumination light, the reflected light.

Incidentally, supposing that the optical path split element deflects the light beam at a right angle along any one of the optical paths, the optical system of the projection apparatus becomes easier to design, and, at the same time, the assembly and the adjustment are facilitated at the assembling work when manufactured. The workability is therefore ameliorated. As a matter of course, the angle at which the light beam is reflected (deflected) along the optical path is not particularly limited but may be arbitrarily set in accordance with design conditions and the configuration of the projection apparatus.

Further, it is desirable that respective focal positions of a plurality of lens elements constituting the fly's eye lens be located on the light split surface of the optical path split element.

Then, according to the present invention, an optical distance (length of the optical path) along the optical axis between the light split surface and the relay optical system and an optical distance between the relay optical system and the reflection type light valve (illuminated object) be equal to a focal length of the relay optical system.

With this configuration, the light beams emerging from the respective lens elements constituting the fly's eye lens are converged respectively on the light split surface. The thus converged light beams, after turning out diffused light beams therefrom, fall uniformly on the same portion (entire surface) on the light valve via the relay optical system.

Then, the light beams are, after being specular-reflected by the reflection type light valve, respectively converged again on the light split surface of the optical path split element. The reflected light beam is converged at a point-symmetric position to the previous converging position of the illumination light beam about the optical axis.

The operation of the thus constructed present invention will be described with reference to FIG. 3. Referring to FIG. 3, the light beams from the fly's eye lens (unillustrated) are reflected by or penetrate an optical path split surface 74 and are guided to a light valve 76. However, a converging point A is defined as a convergent position of the illumination light from one lens element of the fly's eye lens.

Herein, when the illumination light is reflected by the optical path split surface A, it may be sufficient that the converging point A has at least the reflecting action. When the optical path split surface A transmits the illumination light, it may be sufficient that the converging point A has the transmitting action. Corresponding to the respective cases, however, the layout of the light source of the illumination optical system and the fly's eye lens differs.

In any case, the illumination light beam from the converging point A becomes a divergent light beam and is incident on a relay lens 75. It is because the focal positions of the respective lens elements are aligned on the optical path split surface A. This is the same with a point B and other converging positions. Further, a divergence angle of the divergent light from this converging point is the same, if the individual lens elements of the fly's eye lens are identical with each other.

Herein, a light beam $\gamma$ emerging from, e.g., a point O on the optical axis travels while being diverged and falls on a relay lens 75. Then, the arrangement is such that an optical distance along the optical axis between the relay lens 75 and the optical path split surface 74 is equal to a focal length of the relay lens 75. The divergent light beam $\gamma$ incident on the relay lens 75 is therefore collimated, and the light valve 76 is irradiated with this collimated light beam.

On the other hand, a divergent light beam $\alpha$ emerging from the converging point A is also diverged at the same divergence angle and falls on the relay lens 75. The light beam a is refracted therein and falls on the same portion (on the light valve 76) as that of the previous light beam $\gamma$.

From this, it follows that the divergence angles from the individual converging points are the same, and, hence, when presuming an optical path of a ray $\alpha_1$ parallel to a ray $\gamma_1$, these parallel rays are converged at the same portion (point P) on the focal surface of the relay lens 76.

The present invention provides the arrangement in which the optical distance along the optical axis between the relay lens 75 and the light valve 76 is equal to the focal length of the relay lens 75, and it follows that this condition is satisfied.

This is the same with divergent light beams from other converging points. Supposing that the point B is a converging point, it can be understood that a ray $\beta_1$ parallel to the ray $\gamma_1$ is also converged at the same converging position (point P). Therefore, a divergent light beam $\beta$ therefrom also falls on the same portion on the light valve 76.

As described above, a group of light beams split within the section of the light beam by the respective lens elements of the fly's eye lens emerge from the individual lens elements and are converged at the individual converging points on the optical path split surface. Then, these light beams turn out divergent light beams from these converging points and respectively, after being incident on the relay lens 75, fall on the same area on the light valve 76.

Accordingly, when the light valve 76 is irradiated with the light beams from the optical path split surface 74 (respective converging points) via the relay lens 75, all the light beams from the individual converging points fall on the same portion, and hence the light valve 76 is irradiated with the light beams exhibiting the uniform intensity.

Next, the reflected light beam from the light valve 76 reaches a converging position on the optical path split surface 74 via the relay lens 75. In this case, this reflected light beam becomes a convergent light beam. That convergent position becomes, however, a light source position on the optical path split surface 74, i.e., a point-symmetric position to the above converging point with respect to the optical axis.

Explaining this briefly, the light beam reflected by the light valve 76 emerges at the same angle as the incident angle from the reflecting surface of the light valve and therefore travels along the optical path symmetric to the incident light beam with respect to the normal line of the reflecting surface of the light valve.

For instance, the ray $\alpha_1$ is refracted by the relay lens 75 and reaches the point P. The ray $\alpha_1$ is, however, reflected therefrom at the same reflecting angle as the incident angle and again reaches the relay lens 75. At this time, an incidence position of a reflected ray $\alpha_1'$ toward the relay lens 75 becomes a symmetric position (about the optical path of the ray $\gamma_1$) with respect to the normal line at the point P to the incidence position of the previous ray $\alpha_1$.

Seeing this reversely, the ray traveling backward along the optical path of the reflected ray $\alpha_1'$ is a ray converged at the point P, and, therefore, the reflected ray $\alpha_1'$ incident on the relay lens 75 is refracted therein and turns out a ray traveling backward along the optical path parallel to the ray $\alpha_1$ (ray $\gamma_1$).

For this reason, this reflected ray $\alpha_1'$ travels along the optical path in the symmetric position to the ray $\alpha_1$ with respect to the ray $\gamma_1$. The reflected ray $\alpha_1'$ therefore, when reaching the reflecting surface of the optical path split surface 74, comes to the point B existing in the symmetric position to the previous converging point A with respect to an intersecting point O with the optical axis.

This is the same with another ray $\alpha_2$ from the converging point A. A reflected ray $\alpha_2'$ reaching a point Q on the light valve 76 and reflected therefrom also similarly comes to the point B existing in the symmetric position.

Accordingly, the light beams, which are diverged from the respective converging points on the optical path split surface 74, fall on the light valve 76 via the relay lens 75. The light beams are individually reflected therefrom and, thereafter, converged at the point-symmetric positions to the converging points defined as emerging points on the optical path split surface 74 with respect to the intersecting point with the optical axis.

The above-explained path of the reflected light is a descriptive of the path of the light that is specular-reflected by the light valve. It follows that the scattered reflection light passes along a path exclusive this path. Hence, for forming an image by use of the specular-reflection light, these light beams may be selected at the reflection light converging points on the optical path split surface.

For example, only the light beams converged at the reflection light converging points on the optical path split surface are reflected or penetrate and thus taken out. The thus taken-out light beams are guided to the imaging optical system. When taking such a configuration, the projection apparatus using the specular reflection light can be constructed.

Reversely, only the specular reflection light is taken out, and other reflected light (scattered reflection light) is selectively taken out and guided to the imaging optical system. When configured in thus way, it follows that the projection apparatus employing the scattered reflection light can be constructed.

Also, according to the present invention, the plurality of lens elements constituting the fly's eye lens are preferably arranged in the point-symmetric positions about the optical axis. In the case of this arrangement, the converging positions, existing on the light split surface of the optical path split element, of the light beams from the respective lens elements, are the point-symmetric positions about the intersecting point with the optical axis on the light split surface.

For this reason, the light beam emerging from each lens element and reaching the converging point (light source converging point) on the optical path split surface is specular-reflected by the light valve element. The light beam thereafter again reaches the optical path split surface. In this case, the specular reflection converging point coincides with other light source converging points.

In this instance, the specular reflection light from the light valve element travels along the path directed reversely to the light beam from the light source and is therefore guided backward to the illumination optical system. Thus, it is difficult to guide the light beam to the imaging optical system.

The scattered reflection light beams, however, reach the portions other than these converging points. Hence, these reflected light beams from the light source are taken out at the portions exclusive of the convergent points on the optical path split surface. With this configuration, only the scattered reflection light beams can be taken out and guided to the imaging optical system, and hence the projection apparatus using the scattered reflection light beams can be constructed.

For example, the light beams from the light source are guided to the light valve by a combination with the optical path split element composed of a transparent substrate provided with the reflecting mirror portions formed in only the minute areas including the converging points of the light beams from the light source. At the same time, the direct reflection light beams in the reflected light beams therefrom are again guided toward the light source by use of the reflecting mirror portions.

On the other hand, the scattered reflection light beams penetrate the transparent substrate member (exclusive of mirror portions) of the optical path split element and can be therefore selectively taken out. Then, the light beams passing therethrough are guided to the imaging optical system, thereby projecting the projected image employing the scattered reflection light on the screen.

The following configuration can be also actualized. Reversely, by a combination with the optical path split element consisting of the reflecting surface having the minute holes formed in the areas inclusive of the converging points of the light beams, the light beams from the light source and the direct reflection light beams reflected by the light valve pass therethrough. The scattered reflection light beams reflected by the light valve are reflected and selectively taken out.

Further, according to the present invention, the plurality of lens elements constituting the fly's eye lens are preferably arranged in the positions exclusive of the point-symmetric positions about the optical axis. In the case of this arrangement, the converging points of the illumination light beams from the respective lens elements are not coincident with the converging points of the reflected light beams.

For this reason, the optical path splitting entails the construction for directly splitting the reflected light at the point where the reflected light converges. Owing to this construction, it is possible to selectively guide either the direct reflection light or the scattered reflection light that are split therein to the imaging optical system. The projection apparatus employing the direct reflection light or the scattered reflection light can be constructed.

Giving one example, the reflecting mirror portions including the transmitting portions formed only in the convergent positions of the direct reflection light beams are applied to the optical path split element. In this case, the illumination light beams are reflected by the reflecting portions (the convergent points of the illumination light beams serve as a part of the reflecting mirror portions) and guided to the reflection type light valve.

Subsequently, when the reflected light beams from the reflection type light valve again reach the optical path split element, the scattered reflection light beams are reflected once again by the reflecting mirror portions and guided toward the light source. The direct reflecting light beams, however, penetrate the transmitting portions and are then selected. The direct reflection light beams passing therethrough are guided to the imaging optical system, thereby making it possible to construct the projection apparatus using the direct reflection light.

Further, when the reflecting mirror portions having the transmitting portions both in the illumination light converging positions and in the reflection light convergent positions are applied to the optical path split element, the optical path split element transmits both of the light beams from the light source and the direct reflection light but reflects and splits only the scattered reflection light. Hence, if there is taken the construction for selecting and guiding the scattered reflection light to the imaging optical system, it follows that the projection apparatus making use of the scattered reflection light can be constructed.

Based on the configuration of the optical path split element explained above, the transmitting areas which transmit the light beams are formed in the portions, corresponding to the focal positions of the respective lens elements, on the light split surface of the optical path split element. The reflecting portions may be, however, formed in the portions, corresponding to the focal positions of the individual lens elements, on the light split surface of the optical path split element. The reflecting mirror portions formed in predetermined positions on, e.g., a glass plate are also applicable to the optical path split element.

As described above, according to this invention, a broad application can be attained based on selecting either the specular reflection light from, e.g., the reflection type light valve or the scattered reflection light is employed by combining the changed configurations of the fly's eye lens and of the optical path split element.

The optical path split element according to the above-described invention of the present application incorporates the fundamental function to split and synthesize the optical paths of the illumination optical system and of the imaging optical system. As explained above, however, the optical path split element desirably incorporates the function to selectively split the direct reflection light and the scattered reflection light. The optical path split element is not, if these functions are incorporated thereinto, confined to the constructions illustrated in the present application.

Furthermore, to accomplish one object given above, according to a further aspect of the present invention, there is provided an illuminating system comprising: a light source; a fly's eye lens having a plurality of lens elements; an optical path split element having a light split surface disposed in focal positions of the plurality of lens elements; and a relay optical system. In this illuminating system, an optical distance along the optical axis between the light split surface and the relay lens and an optical distance along the optical axis between the relay optical system and an illuminated object are coincident with a focal length of the relay optical system. The optical axis of the relay optical system is parallel to a direction of a normal line of the illuminated object. Only portions, corresponding to the focal positions of the plurality of lens elements, on the light split surface reflect or transmit the light beams emerging from the fly's eye lens.

Based on this construction, even when an uneven intensity distribution and intensity ununiformity appear in the illumination light beams from the light source, the illumination areas on the illuminated object (e.g., reflection type light valve) can be irradiated with the intensity-uniformized light beams.

At this time, the optical axis of the relay optical system is parallel to the direction of the normal line of the illuminated object, and, therefore, even if the illumination light beam is not orthogonal to the surface of the illuminated object, the entire illumination areas can be supplied with the intensity-uniformized illumination light.

According to still a further aspect of the present invention, there is provided a detecting apparatus with an illuminating system, comprising: a light source; a fly's eye lens having a plurality of lens elements; an optical path split element having a light split surface disposed in focal positions of the plurality of lens elements; a relay optical system; and a detector. In this detecting apparatus, an optical distance along the optical axis between the light split surface and the relay lens and an optical distance along the optical axis between the relay optical system and an illuminated object are coincident with a focal length of the relay optical system. The light beams emerging from the fly's eye lens are reflected by or penetrate only the portions, corresponding to the focal positions of the plurality of lens elements, on the light split surface. Reflected light beams from the illuminated object penetrate or are reflected by areas different from the portions on the light split surface and are guided to the detector.

The detecting apparatus based on the construction given above is capable of well detecting the illuminated object uniformly illuminated with the light. Note that the optical path splitting/synthesizing action in the detecting apparatus based on the above construction is the same as that in the illuminating system as well as in the projection apparatus described above. At this time, the reflection and the transmission are separately employed in the portions, corresponding to the focal positions of the plurality of lens elements, on the light split surface and in the areas different from these portions. It is thus possible to individually extract the direct reflection light (specular reflection light) and the scattered reflection light on the illuminated object. That is, the illuminated object uniformly illuminated with the light is independently detectable in a bright or dark field.

As described above, this invention can be applied to optical apparatuses other than the above-explained projection apparatus.

BRIEF DESCRIPTION OF THE DRAWINGS

Other objects and advantages of the present invention will become apparent during the following discussion in conjunction with the accompanying drawings, in which:

FIG. 4 is a view schematically showing a projection apparatus in accordance with a first embodiment of the present invention;

DETAILED DESCRIPTION OF THE PREFERRED EMBODIMENTS

Figure 1:
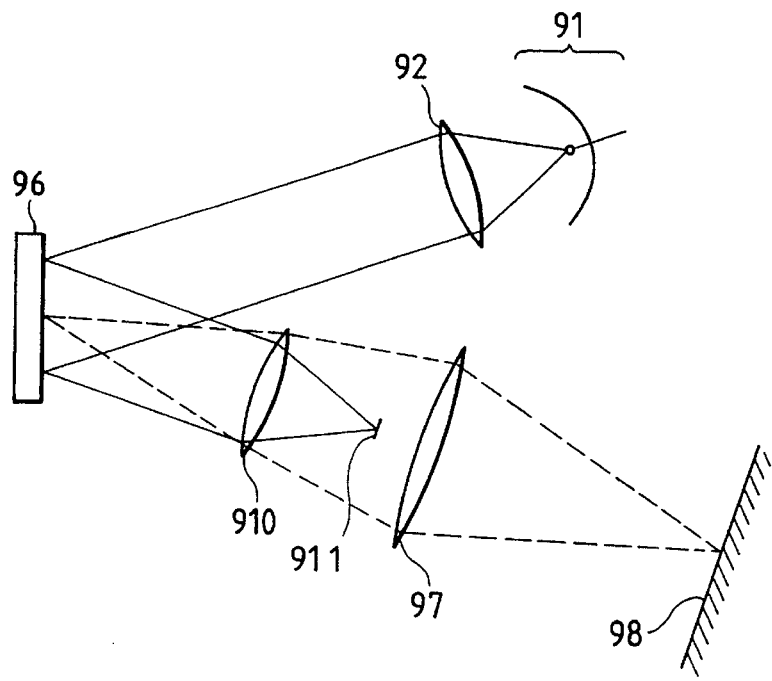
FIG. 1 is a view illustrating a conventional projection apparatus using a Schlieren optical system.
Figure 2:
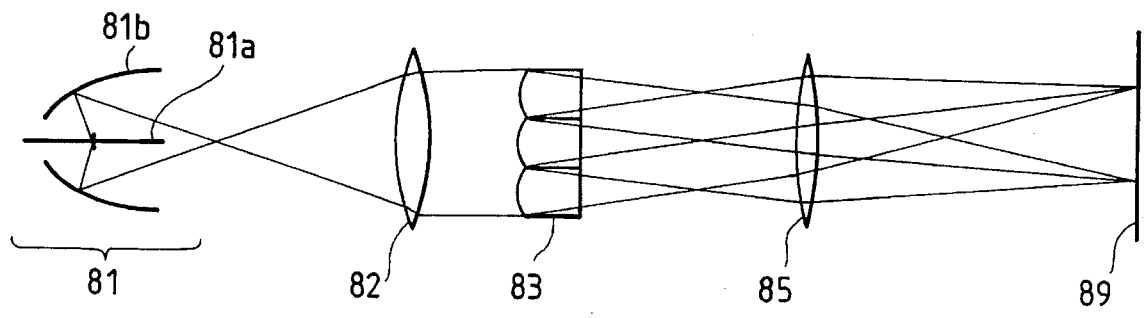
FIG. 2 is a view illustrating a conventional illumination optical system using a fly's eye lens.
Figure 3:
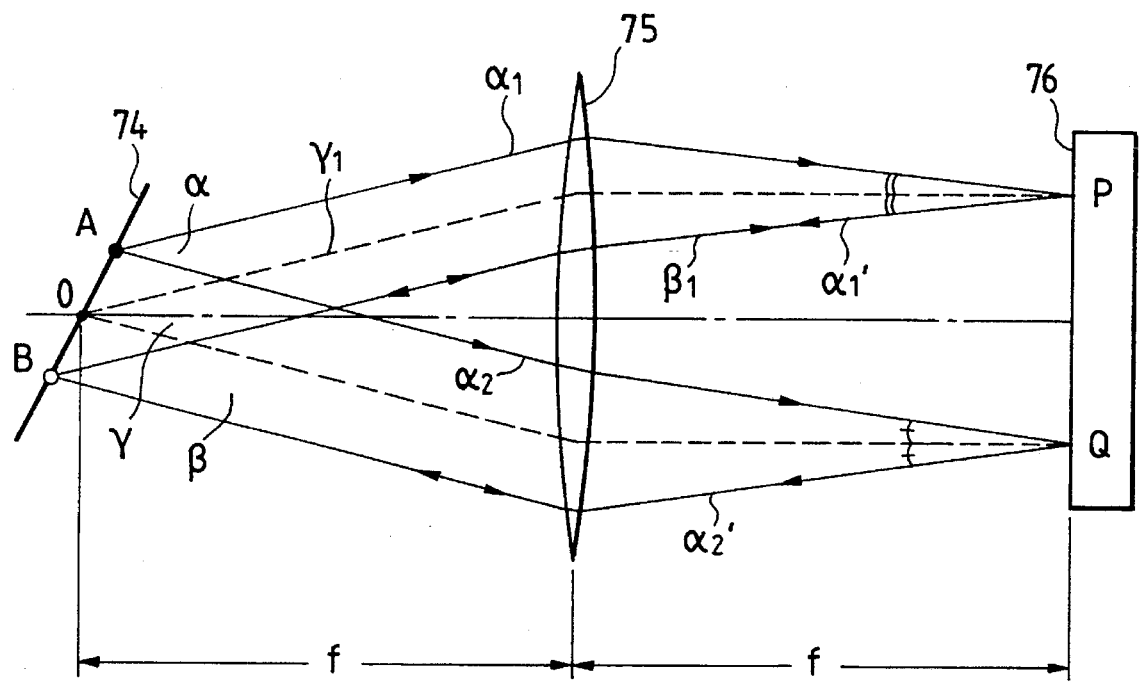
FIG. 3 is a view of assistance in explaining the principle of the present invention.

The present invention will be hereinafter be described in greater detail by way of embodiments. FIG. 4 schematically illustrates a configuration of a projection apparatus in accordance with one embodiment of the present invention. In the embodiment illustrated in FIG. 4, an illumination optical system and an imaging element are constructed so that respective optical paths thereof are split and synthesized by an optical path split surface 4, and, at the same time, only beams of scattered reflection light in the beams of reflected light from a light valve 6 are guided to an imaging optical system, thereby forming an image on a screen 8.

To start with, beams of light from a light source 1 consisting of a lamp 1a and an elliptical mirror 1b are collimated into parallel beams of light by a condenser lens 2 and incident on a fly's eye lens 3. The light valve 6 is thus irradiated with the light beams via the optical path split surface 4 and a relay lens 5. Then, the scattered reflection light beams are reflected by the optical path split surface 4 via the relay lens 5 and incident on a projection lens 7, thereby forming an image on the screen 8.

Herein, the fly's eye lens 3 in this embodiment is constructed of lens elements 3a–3i disposed in point-symmetric positions with respect to the optical axis. That is, in addition to the lens element 3e with an optical axis O being centered, other lens elements are laid out respectively in the point-symmetric positions as in the case of 3a and 3i, 3b and 3h and so on.

Then, the individual lens elements 3a–3i constituting the fly's eye lens 3 are, as illustrated in FIG. 4, so arranged as to be shifted stepwise corresponding to a tilt of the optical path split surface 4 so that focal positions of the lens elements 3a–3i are aligned on this split surface.

The optical path split surface 4 consists of a reflecting surface (on the side of the light valve) tilted at 45° to the optical axis (normal line of the reflecting surface of the light valve 6) of the illumination light beams. The optical path split surface 4 is formed with minute through-holes 15 serving as partial transmitting portions.

These through-holes 15 are formed corresponding to the focal positions of the lens elements 3a–3i and may have sizes enough to transmit the converged light beams from the individual lens elements 3a–3i. Herein, a plurality of light source images are formed in the positions of the through-holes 15 by the lens elements 3a–3i of the fly's eye lens 3. In accordance with this embodiment, the light source is not conceived as a point light source, and, therefore, the plurality of light source images do not turn out the point light source but have a finite size. Accordingly, the size of the through-hole 15 is larger than each of the plurality of light source images. Note that the through-holes 15 of the optical path split surface 4 are, because of being provided corresponding to the lens elements 3a–3i, also disposed respectively in the point-symmetric positions about a point-of-intersection O with the optical axis.

Further, the relay lens 5 is disposed so that the optical axis thereof is coincident (orthogonal to the reflecting surface) with the normal line of the reflecting surface of the light valve 6. The relay lens 5 is also disposed in such a way that an optical distance (length of the optical path) between the optical path split surface 4 and the light valve 6 is equal to a focal length f of the relay lens 5.

Herein, the focal length of the relay lens may be selected based on the layout of the light valve and the optical split element as well as on design conditions of the whole apparatus; or alternatively, the layout of these members may be determined based on the preselected focal length of the relay lens.

The projection lens 7 is constructed so that the reflecting surface of the light valve 6 is conjugate to the screen 8. The projection lens 7 serves to form an image of the reflected light space-modulated by the light valve 6 on the screen 8. If the position of the screen 8 is shifted, an unillustrated adjusting element may adjust a focal point by shifting the position of the projection lens 7 along the optical-axis direction.

The projection apparatus in accordance with this embodiment is constructed described above, and, hence, the light beams emitted from the light source 1 are substantially collimated by the condenser lens 2. Thereafter, the parallel light beams travel to the lens elements 3a–3i of the fly's eye lens 3 so that these light beams are converged at the focal positions thereof. However, the through-holes 15 of the optical path split surface are formed in the positions corresponding to the respective converging points, and, therefore, the optical path split surface 4 transmits these light beams.

The respective illumination light beams emerging from the through-holes 15 of the optical path split surface 4 become divergent light beams. The divergent light beams fall on the relay lens and are, at the same time, refracted therein. Subsequently, the same area of the light valve 6 is irradiated with the respective illumination light beams. These individual illumination light beams are the light beams into which the light beam from the light source is split within the light beam section. The illumination light beams are, even when there exists a distribution of intensity and an ununiformity in each split portion, averaged on the light valve 6 and therefore uniformized in terms of the intensity.

When the light valve 6 is irradiated with these illumination light beams, partially space-modulated reflected light is obtained based on a display or non-display of video data on the light valve 6. That is, specular reflection (direction reflection) light beams are produced in the portion where the video data is not displayed. Whereas in the video data displayed portion, it follows that the scattered reflection light beams are produced. Then, these light beams are selectively split to form an image, and it follows that the video data displayed on the light valve 6 is projected.

Figure 5:
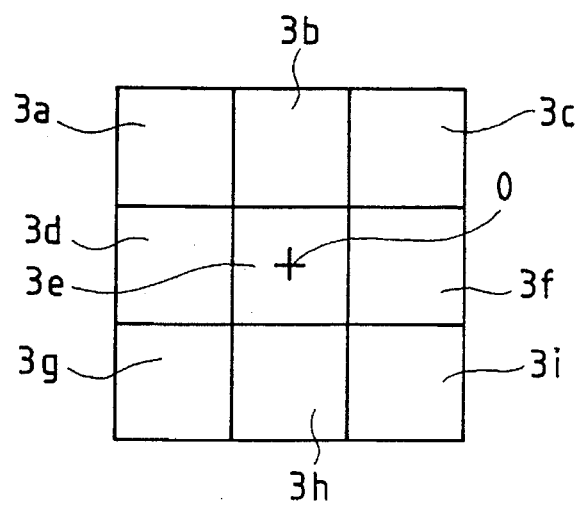
FIG. 5 is a front view of a fly's eye lens applied to the first embodiment.

In accordance with this embodiment, as shown in FIG. 5, the lens elements of the fly's eye lens 3 are arranged in the point-symmetric positions, and hence the through-holes 15 of the optical path split surface 4 are also disposed individually in the symmetric positions. As discussed above, the reflected light beams that are directly reflected on the light valve 6 are converged at the point-symmetric positions to the converging points when the optical path split surface transmits the illumination light beams and therefore guided to the through-holes disposed in the convergent positions of the reflected light beams. On the other hand, the scattered reflection light beams that are scatter-reflected on the light valve 6 are guided to the areas other than the through-holes.

Accordingly, the direct reflection light beams in the reflected light beams incident on the optical path split surface 4 travel through the through-holes 15 and are guided toward the light source. The scattered reflection light beams are totally reflected by the specular areas exclusive of the through-holes of the optical path split surface 4 and then incident on the projection lens 7, thereby forming an image on the screen 8 bearing in a conjugate relationship with the light valve 6.

As explained above, in the projection apparatus in this embodiment, since the reflecting surface of the light valve 6 is orthogonal to the optical axis of the illumination optical system, the illumination light beams vertically fall thereon, and, simultaneously, the light valve is irradiated with the intensity-uniformized illumination light beams. Consequently, there are not produced a distribution of luminance of the reflected light beams and an ununiformity of the luminance. Further, the light valve 6 and the screen 8 are held to bear an exactly face-to-face relationship with each other, with the result that no distortion appears in the projected image. Incidentally, that the surfaces have the exactly face-to-face relationship with each other implies that the surfaces are in a parallel or perpendicular relationship with each other.

On the other hand, the light split element surely splits the direction reflection light beams at the minute through-holes and, at the same time, sends the scattered reflection light beams to the imaging element after reflecting these light beams on the total reflecting surface exclusive of the minute through-holes. Therefore, since the projected image can be formed by effectively making use of the scattered reflection light beams, a high brightness and a high sharpness of the projected image are obtained.

Figure 6:
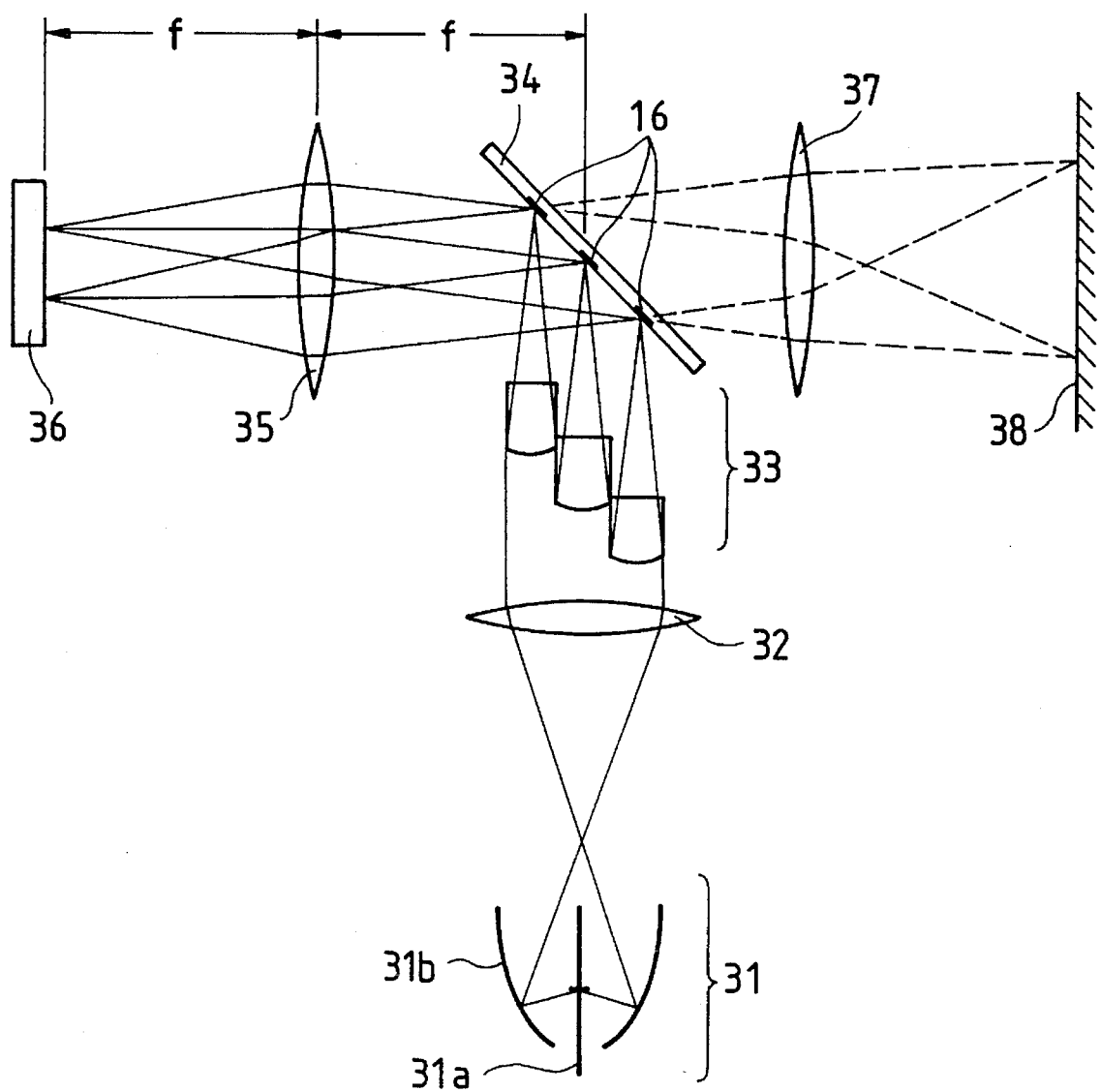
FIG. 6 is a view schematically illustrating the projection apparatus in accordance with a second embodiment of the present invention.

Next, FIG. 6 schematically illustrates a configuration of the projection apparatus in accordance with a second embodiment of the present invention. The embodiment illustrated in FIG. 6 provides the following arrangement. The light beams from the illumination optical system are reflected by the optical path split surface, thus deflecting the light beams along the optical path. The light valve element is irradiated with the light beams reflected therein, and, simultaneously, the reflected light beams penetrate the optical path split surface and are guided to the imaging element.

The light source 1, a condenser lens 32, a fly's eye lens 33, a relay lens 35 and a projection lens 37, which are used in the second embodiment shown in FIG. 6, are substantially the same as those in the first embodiment. An optical path split surface 34, however, assumes a configuration different from that in the first embodiment.

The fly's eye lens 33 employed in the second embodiment is shaped the same as the fly's eye lens shown in the first embodiment. The optical path split surface 34 is composed of a transmitting surface tilted at 45° to the optical axis (normal line of the reflecting surface of the light valve 36) of the illumination light beams. The fly's eye lens 33 therefore includes lens elements shifted stepwise correspondingly so that the focal positions of the individual lens elements are aligned on the optical path split surface 34.

The relay lens 35 is disposed so that the optical distance between the light valve 36 and the optical path split surface 34 is equal to the focal length f of the relay lens 35. This arrangement is the same as the first embodiment.

The optical path split surface 34 in the second embodiment includes a reflecting mirror element constructed of a transmitting plate made of, e.g., a glass plate on which a metal is partially deposited. The optical path split surface 34 has reflecting portions formed in positions corresponding to the focal positions of the respective lens elements.

With this configuration, the illumination light beams emitted from the light source 1 are split by the individual lens elements of the fly's eye lens 33 and emerge therefrom. Thereafter, the illumination light beams are converged at the respective reflecting portions 16 of the optical path split surface 34 and reflected therein, resulting in divergent light beams. The same area on the light valve 35 is irradiated respectively with these divergent light beams via the relay lens 35.

Further, the reflected light beams from the light valve 35 reach the optical path split surface 34 via the relay lens 35. As in the same way with the first embodiment, however, the lens elements employed in this second embodiment are disposed in the point symmetry. Hence, the specular reflection light beams that are not scattered on the light valve 36 but directly reflected reach the reflecting portions 16 of the optical path split surface so as to be converged thereat.

Therefore, the direct reflection light beams are reflected by the reflecting portions 16 in accordance with a tilt of this optical path split surface 34 and then guided toward the light source. The scattered reflection light beams, however, penetrate the areas other than the reflecting portions 16 and reach the projection lens 37, thereby forming an image on the screen 38.

As described above, in accordance with this embodiment, the optical path split element involves the use of the partial transmitting portions formed on the transparent transmitting member; and the illumination optical system and the projection optical system are synthesized and split as well. Note that a focus of the projected image through the projection lens 37 is, as a matter of course, adjusted in the same manner as the first embodiment; or alternatively, there may be taken a configuration in which the focal adjustment is done by moving members of other imaging optical system.

As discussed above, in the second embodiment also, the light beams emitted from the light source 31 penetrate the respective lens elements and, via the fly's eye lens 33, fall on the same area on the light valve. Accordingly, the illumination intensities are uniformized over the entire illumination areas.

Further, as in the first embodiment discussed above, the video data display surface (reflecting surface) of the light valve and the screen are conjugate to each other and arranged in the exactly face-to-face relationship. This yields an advantage in which no distortion is produced in the projected image.

The above-discussed first and second embodiments have presented the configuration wherein the scattered reflection light beams in the reflected light beams which are space-modulated and reflected by the light valve are projected to form the image on the screen. Owing to an application of the present invention, it is possible to construct an apparatus taking such an arrangement that the light beams directly reflected by the light valve are projected to form an image on the screen. The following is a description of an embodiment thereof.

The projection apparatus in accordance with a third embodiment of the present invention has the same layout of the fundamental members as that of the members used in the first embodiment. The fly's eye lens and the optical path split surface are, however, constructed in the manner which follows.

Figure 7A:
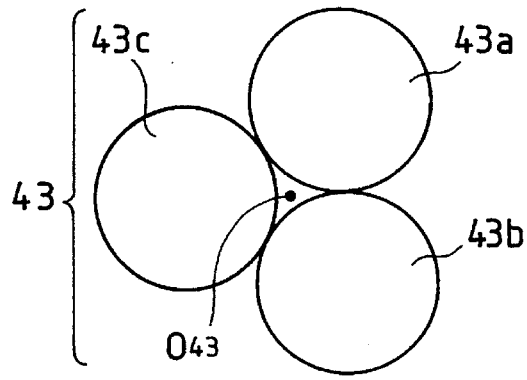
FIG. 7A is a front view of the fly's eye lens applied to the projection apparatus in accordance with a third embodiment of the present invention.

A fly's eye lens 43 used in the third embodiment is, as illustrated in FIG. 7A, constructed of lens elements 43a, 43b, 43c. The individual lens elements 43a, 43b, 43c are disposed in positions exclusive of the point-symmetric positions about an optical axis $O_{43}$.

Figure 7B:
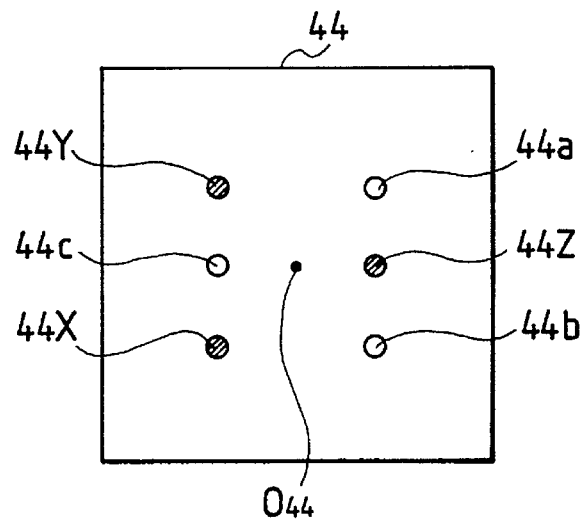
FIG. 7B is a view showing a configuration of an optical path split surface in the projection apparatus in accordance with the third embodiment of the present invention.

Also, an optical path split surface is, unlike the first embodiment, formed with partial reflecting portions on the transmitting surface. This optical split surface 44 is also disposed at a tilt of 45° to the optical axis of the illumination light beams. As shown in FIG. 7B, however, the reflecting portions are not formed in focal areas 44a–44c of the respective lens elements. The optical path split surface 44 has reflecting portions 44X, 44Y, 44Z formed of minute specular areas serving as partial reflecting portions arranged in the point-symmetric positions about an optical-axis position $O_{44}$ to these focal areas 44a–44c.

Accordingly, the light beams converged on the optical path split surface 44 through the fly's eye lens 43 penetrate unchanged and fall on the relay lens while being diverged. As in the same way with the first embodiment, the same irradiation area on the light valve is irradiated with these respective light beams.

Further, the scattered (reflected) light beams in the light beams reflected by the light valve pass through transmitting areas exclusive of the reflecting portions 44X–44Z of the optical path split surface 44 and are guided toward the light source. On the other hand, the direct reflection light beams that are specular-reflected by the light valve are converged again at point-symmetric positions on the optical path split surface 44 with respect to the optical axis $O_{44}$ to the positions 44a–44c at which the light beams are converged on the optical path split surface 44 through the fly's eye lens 43.

This converging state of the direct reflection light beams is the same as the first embodiment. In accordance with the third embodiment, however, the reflecting portions 44X–44Z are formed in the converging positions of the direct reflection light beams. Hence, the light beams are total-reflected by the minute reflecting portions (specular areas) 44X, 44Y, 44Z formed on this optical path split surface 4 and then guided to the projection lens.

Subsequently, the projection lens is, as in the same way with the first embodiment, constructed to keep the conjugate relationship between the video data display surface (reflecting surface) of the light valve and the screen. The direct reflection light beams incident on the projection lens are projected on the screen through the projection lens, thereby forming an image thereon.

Figure 8A:
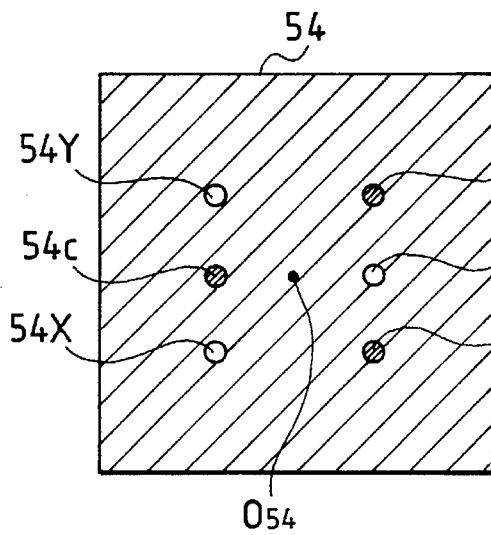
FIG. 8A is a view illustrating a configuration of an optical path split surface in the projection apparatus in accordance with a fourth embodiment of the present invention.

When applying the above-mentioned reflection light beams to the layout of the second embodiment, there may be employed an optical path split surface 54 used in a fourth embodiment of the present invention illustrated in FIG. 8A. The arrangement of using the optical path split surface 54 in accordance with this fourth embodiment involve the sue of the fly's eye lens constructed the same as the above-discussed third embodiment. The optical path split surface 54 is, however, formed in the manner which will hereinafter be stated.

The optical path split surface 54 employed in the fourth embodiment is based on a total reflection mirror as a basic member but is formed with partial transmitting portions (through-holes). These transmitting portions are arranged in position corresponding to the reflecting portions in the third embodiment discussed above. The same reflecting portions as other portions are formed in lens element converging positions 54a–54c of the fly's eye lens having point-asymmetric lens elements. However, minute through-holes 54X, 54Y, 54Z defined as partial transmitting portions are provided, corresponding to the respective converging positions, in point-symmetric positions with respect to an optical-axis position $O_{54}$ to these converging positions 54a–54c.

Accordingly, the light beams converged on the optical path split surface 54 through the fly's eye lens are reflected therein and incident on the relay lens while being diverged. At the same time, the irradiation light beams emerging from the respective lens elements are guided to the same irradiation area on the light valve from the relay lens.

Then, the scattered reflection light beams scattered by the video data display portion with respect to the light beams reflected by the light valve are total-reflected by the area other than the through-holes formed in the optical path split surface 54 and guided toward the light source.

Also, the direct reflection light beams that are specular-reflected by the light valve are converged again at the point-symmetric positions with respect to the optical axis to the positions at which the light beams are converged on the optical path split surface through the fly's eye lens. It follows that these direct reflection light beams are guided to the minute through-holes 54X, 54Y, 54Z formed in the optical path split surface 54 and therefore incident on the projection lens after passing therethrough. The light beams are then projected by the projection lens on the screen bearing the conjugate relationship with the light valve, thus forming an image on the screen.

Figure 8B:
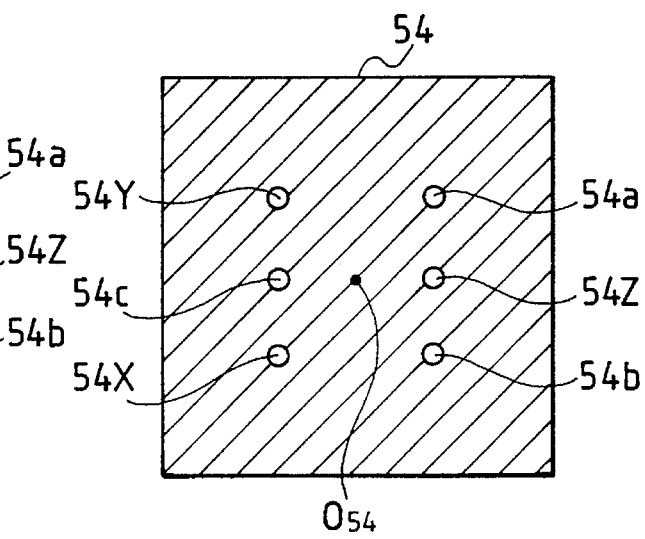
FIG. 8B is a view illustrating a configuration of the optical path split surface in the projection apparatus in accordance with a fifth embodiment of the present invention.

Further, even when using the fly's eye lens exhibiting no point-symmetric layout as shown in FIG. 8A, the scattered reflection light beams can be image-formed. Giving one example by way of a fifth embodiment, as illustrated in FIG. 8B, the transmitting portions are provided in the focal areas 54a–54c, of the lens elements of the fly's eye lens, on the optical path split surface. Moreover, the transmitting portions 54X–54Z are also formed in the point-symmetric position thereto about an optical-axis position $O_{54}$. There may be exemplified the thus constructed optical path split surface incorporated into the same layout of the members in the embodiment illustrated in FIG. 4.

When constructed in this manner, the direct reflection light beams from the light valve penetrate the transmitting portions 54A–54Z on the optical path split surface and are guided toward the light source. These light beams are, however, reflected by the area exclusive of these transmitting portions and guided after being separated by the imaging element.

Note that the optical path split member shown, e.g., FIG. 7B is provided with reflecting portions in the converging positions 44a–44c of the lens elements, and the thus constructed optical path split member is incorporated together with the same fly's eye lens as the above-mentioned into the projection apparatus illustrated in FIG. 6, thereby making it possible to construct a projection apparatus configured to form the image by similarly selectively separating only the scattered reflection light beams.

As stated above, according to the embodiment of the present invention, using the direct reflection light beams or scattered reflection light beams from the light valve can be arbitrarily determined by taking the point-symmetric or point-asymmetric arrangement of the lens elements of the fly's eye lens about the optical axis and further by combining this arrangement with the layout of the transmitting portions and the reflecting portions on the optical path split surface.

Note that the fly's eye lens composed of the plurality of lens elements disposed in the positions excluding the point-symmetric positions is not confined to the fly's eye lens composed of three pieces of lens elements in the above-discussed embodiments. Given hereinbelow is an explanation of a sixth embodiment using a fly's eye lens constructed of five pieces of lens elements.

Figure 9A:
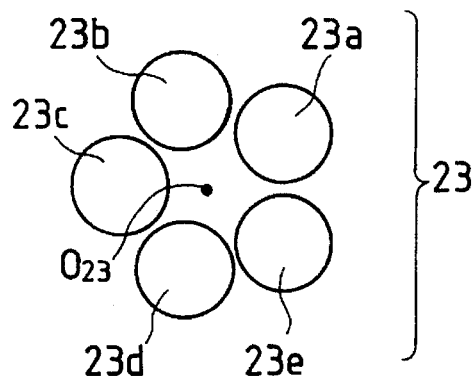
FIG. 9A is a front view of the fly's eye lens applied to the projection apparatus in accordance with a sixth embodiment of the present invention.

FIG. 9A is a front view of a fly's eye lens 23. Referring to FIG. 9A, the fly's eye lens 23 consists of lens elements 23a–23e each assuming a circular shape in section. The lens elements 23a–23e are arranged in positions different from point-symmetric positions about an optical axis $O_{23}$.

Figure 9B:
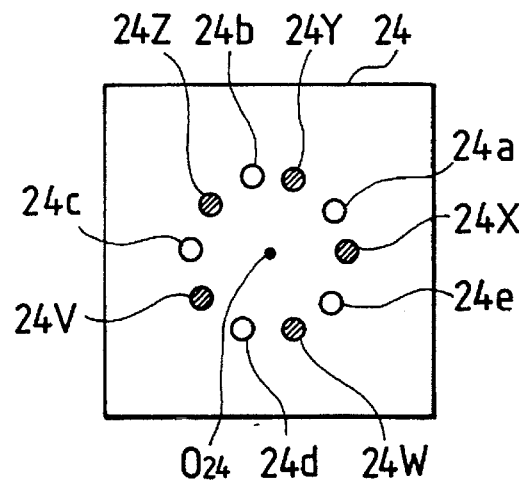
FIG. 9B is a view illustrating a configuration of the optical path split surface applied to the projection apparatus in accordance with the sixth embodiment.

When applying the fly's eye lens shown in FIG. 9A to the projection apparatus in the first embodiment illustrated in FIG. 4, an optical path split surface 24 shown in FIG. 9B is employed in place of the optical path split surface 4 of FIG. 4. Turning to FIG. 9B, the light beams converged by the lens elements 23a–23e of the fly's eye lens 23 travel through areas 24a–24e on the optical path split surface 24. Herein, these areas 24a–24e are not formed with the reflecting portions. However, reflecting portions 24V–24Z are formed in point-symmetric positions about an optical axis $O_{44}$ to these areas 24a–24e. A size of each of these reflecting portions 24V–24Z is substantially equal to a size of each of the areas 24a–24e on the optical path split surface 24.

Figure 10A:
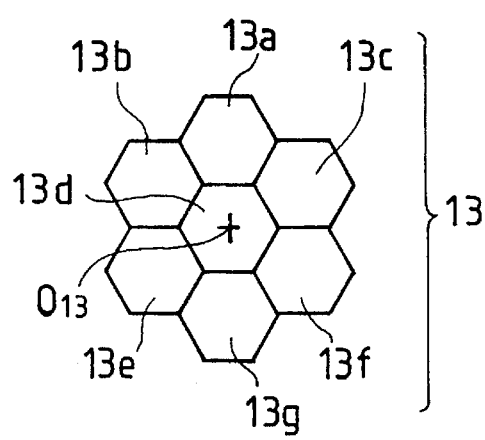
FIG. 10A is a front view of the fly's eye lens applied to a seventh embodiment of the present invention.

Further, in accordance with the embodiment given above, the fly's eye lens composed of the plurality of lens elements disposed in the point-symmetric positions is not limited to the fly's eye lens including the lens elements each assuming the circular shape in section as illustrated in, e.g., FIG. 5. For instance, as depicted in FIG. 10A, there may be used a fly's eye lens 13 constructed of a plurality of lens elements 13a–13g each taking a hexagonal shape in section. A seventh embodiment using this fly's eye lens 13 will be discussed.

At this time, in the case of applying the fly's eye lens 13 to the projection apparatus having the configuration shown in, FIG. 4, if focal lengths of the respective lens elements 13a–13g are equal to each other, the lens elements 13a–13g take the following positional relationship in the optical-axis direction. These lens elements are arranged sequentially from the light source such as the lens element 13g, a couple of the lens elements 13e, 13f, the lens element 13d, a couple of the lens element 13b, 13c and the lens element 13a.

Figure 10B:
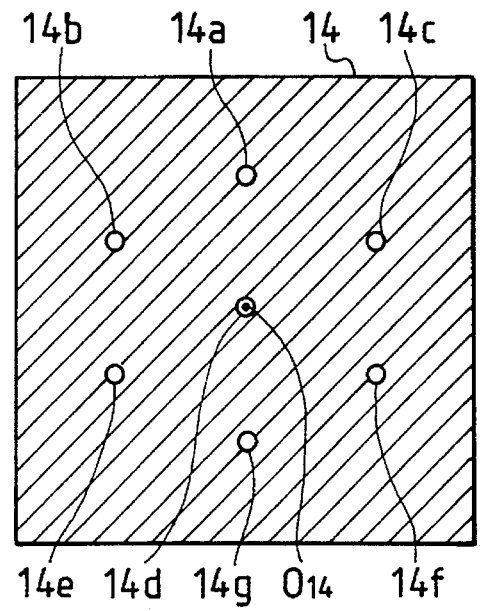
FIG. 10B is a view showing a configuration of the optical path split surface applied to the projection apparatus in accordance with a seventh embodiment.

Further, in this case, an optical path split surface 14 as shown in FIG. 10B is employed. This optical path split surface 14 includes areas 14a–14g formed as through-holes in point-symmetric positions with respect to a point $O_{14}$ intersecting the optical axis, and the area exclusive of these through-holes is provided as a reflecting surface.

As discussed above, according to the present invention, the fly's eye lens may take any configuration in section.

Note that the optical path synthesizing/splitting optical system obtained by combining the illumination optical system and the optical path split element shown in the embodiments of the present invention is applicable to optical systems other than the projection apparatus illustrated in this embodiment on condition that the optical system detects, when an object is irradiated with the illumination light beams, the light beams reflected therefrom.

Figure 11:
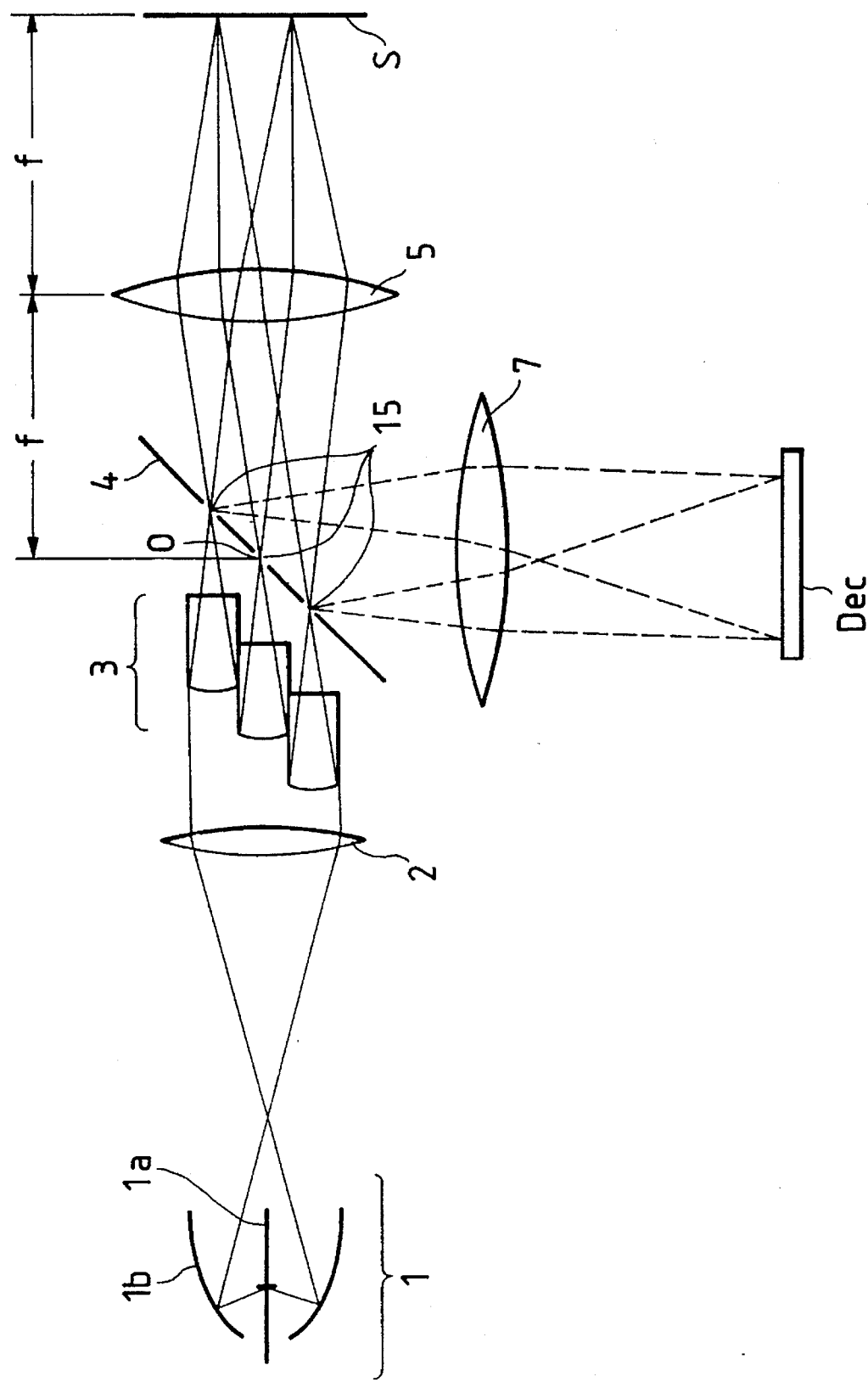
FIG. 11 is a view schematically illustrating an eighth embodiment wherein the present invention is applied to a surface detecting apparatus.

For example, as depicted in FIG. 11, the optical system of this invention is also applicable to a surface inspecting apparatus. A basic layout of the optical system in an eighth embodiment shown in FIG. 11 is the same as that in the first embodiment, and, therefore, an explanation thereof will be omitted herein.

Paying attention to FIG. 11, the light beams from the light source 1 are incident on a fly's eye lens 3 via a condenser lens 2. These light beams are converged by lens elements of this fly's eye lens 3, thereby forming a plurality of light source images on the exit side of the fly's eye lens.

An optical path split surface formed with a reflecting surface and through-holes 15 is disposed so that the through-holes 15 are arranged in the positions where the plurality of light source images are formed. In accordance with this embodiment, the optical path split surface 4 is tilted at 45° to the optical axis of the optical system. The light beams passing through the through-holes 15 of the optical path split surface are converged by the relay lens 5, and an inspected surface S placed in the focal position of the relay lens 5 is illuminated in superposition with the converged light beams. The inspected surface S is thereby irradiated with the intensity-uniformized light beams.

Now, if foreign matters (particles) are adhered to the inspected surface S, or if the inspected surface S has defects, scattered light beams are generated from these particles and defects. These scattered light beams penetrate the relay lens 5 and reach an area different from the through-holes 15 formed in the optical path split surface 4. These scattered light beams are reflected by the reflecting surface on the optical path split surface 4 and pass through the projection lens 7. The light beams then reach a detector Dec composed of, e.g., a CCD. Herein, the inspected surface S is conjugate to the detector Dec through the relay lens 5 and the projection lens 7 as well.

On the other hand, the light beams reflected (specular-reflected) by the inspected surface S travel through the relay lens 5 and come to the through-holes 15 of the optical path split surface. The light beams penetrating these through-holes 15 then travel toward the fly's eye lens 3. Accordingly, the light beams reaching the detector Dec are only the light beams generated by the particles or the defects on the inspected surface S, with the result that only images of the particles or the defects are to be formed on the detector Dec. Namely, in this embodiment, the inspected surface S is detected in a dark field.

As explained above, in accordance with this embodiment, the inspected surface S can be uniformly illuminated with the light and therefore detected with a high accuracy. The inspected surface S and the detector Dec bear the exactly face-to-face relationship with each other, and, hence, no distortion appears in the image formed on the detector Dec.

Figure 12:
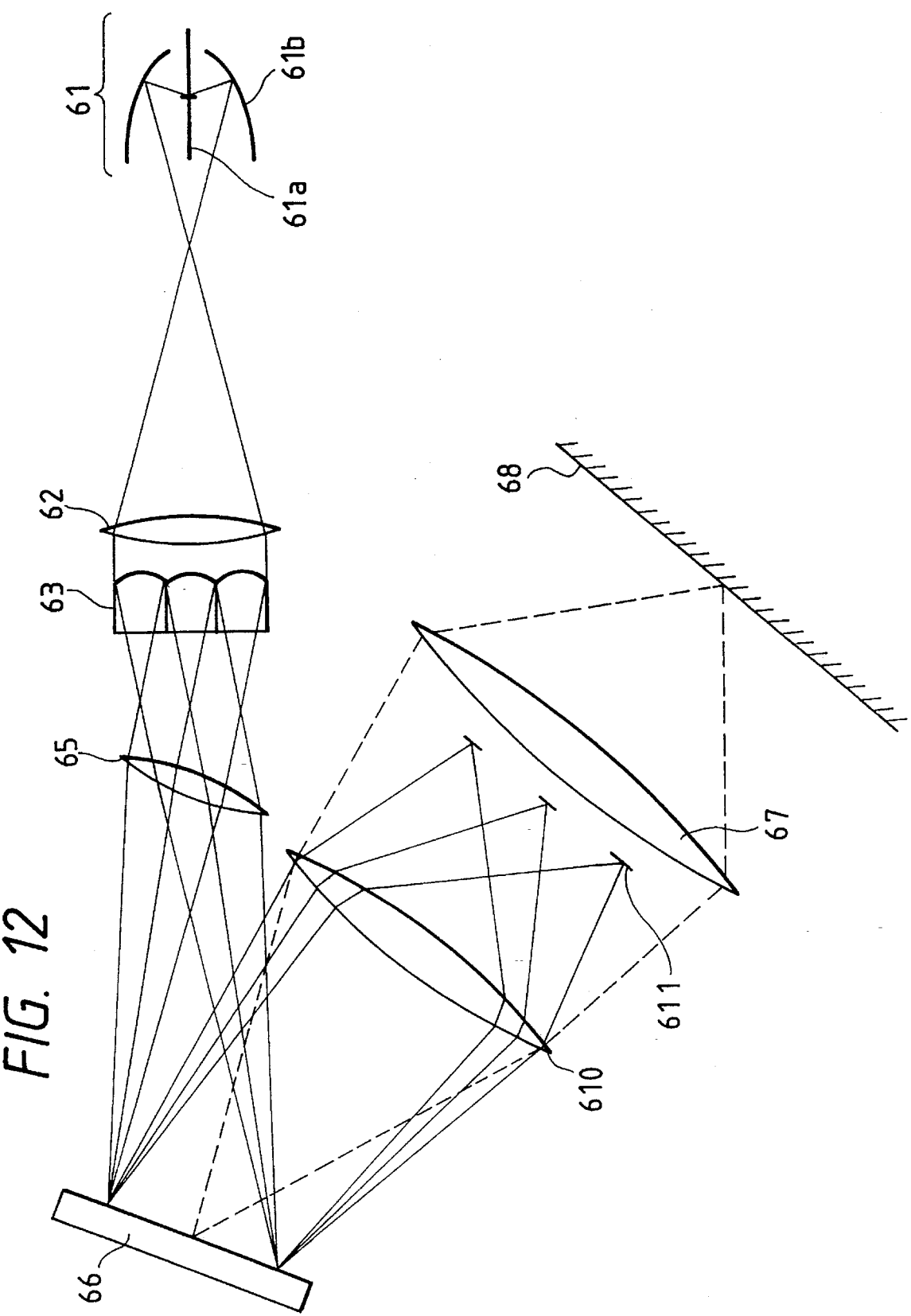
FIG. 12 is a view schematically showing the projection apparatus in accordance with a ninth embodiment of the present invention.

Next, FIG. 12 illustrates one embodiment of the illumination optical system in the projection apparatus in a ninth embodiment of the present invention. This embodiment aims at uniformizing the intensity of the illumination light by using the fly's eye lens in a Schlieren optical system based on a so-called oblique incidence (reflection) method of the prior art.

In this embodiment, a relay lens 65 is disposed so that a reflecting surface of a reflection type light valve 66 is parallel to an optical surface of the relay lens 65. It is because there is produced a difference in terms of an optical distance between each lens element and each of the illumination areas due to an influence of the oblique incidence simply by providing an ordinary fly's eye lens in the optical path of the illumination optical system, and the illumination light exhibiting an uniform intensity over the entire surface is hard to obtain.

To obviate this difficulty, the entire illumination areas can be irradiated respectively with the light beams emerging from the individual lens elements by placing the central surface of the relay lens 65 in parallel to the light valve surface, in other words, by setting the optical axis of the relay lens in parallel to the normal line of the reflecting surface of the light valve.

In each of the embodiments discussed above, the light source composed of the lamp and the elliptical mirror is employed. The light source is not, however, confined to those shown in the embodiments but may involve a combination of, e.g., a lamp and a parabolic mirror.

Each of the embodiments given above yields an advantage in which the illuminated object such as the reflection type light valve can be supplied with the illumination light having an uniform intensity distribution. Further, the luminance of the reflected light becomes uniform owing to this uniform illumination light. Therefore, the luminance of the image relative to the reflected light can be uniformized, or it is possible to obtain the light beams exhibiting the uniform luminance over the entire illumination areas when detecting the reflected light.

Particularly in the embodiment applied to a scatter type projection apparatus using the Schlieren optical system, the luminance of the image projected on the screen is uniformized, and, besides, the image can be made sharper.

Moreover, in the embodiment wherein the optical path split element is employed, the illuminated object such as the reflection type light valve can be illuminated with the light beams by the vertical incidence, and, therefore, the light beams are also reflected therefrom in the vertical direction. With this arrangement, the distortion is not produced in the image obtained from the reflected light beams from the reflection type light valve, thereby making it possible to acquire a well-projected image.

Further, in the embodiment employing the optical path split element, the optical path is split by use of the reflecting portions or the transmitting portions partially provided in the converging positions of the fly's eye lens, and therefore a loss of light quantity can be reduced down to substantially 0%. The illumination light exhibiting a high intensity can be supplied.

In addition to this, it is feasible to extremely reduce the loss of light quantity, on the optical path split element, of the light beams reaching the screen or the detecting element. The luminance of the image projected on the screen can be thereby enhanced, or the light quantity on the detecting element can be increased. Further, if the luminance of the image projected on the screen is set at the same level as the conventional level, a light source having a smaller light quantity than in the prior art can be employed.

Also, in the embodiment using the optical path split element, the optical path of the illuminating system can be partially overlapped with the optical path of the imaging optical system, and down-sizing of the apparatus can be therefore attained.

Furthermore, in the embodiment using the optical path split element, the light beams are perpendicular to the light valve, and hence there are produced advantages in which the design of the apparatus is facilitated, and, besides, the assembly and the adjusting operation when manufactured are also facilitated.

It is apparent that, in this invention, a wide range of different working modes can be formed based on the invention without deviating from the spirit and scope of the invention. This invention is not restricted by its specific working modes except being limited by the appended claims.

What is claimed is:

1. A projection apparatus comprising:

a reflection type light valve;

a light source;

a fly's eye lens disposed in light beams from said light source;

a relay optical system, having an optical axis parallel to a normal line of said reflection type light valve, for guiding the light beams emerging from said fly's eye lens to said reflection type light valve;

an imaging optical system through which said reflection type light valve is conjugate to a screen; and an optical path split element for guiding the light beams from said light source to said reflection type light valve and, guiding reflected light beams from said reflection type light valve to said imaging optical system.

2. The projection apparatus according to claim 1, wherein said fly's eye lens has a plurality of lens elements, and said plurality of lens elements are disposed so that focal positions of said plurality of lens elements are located on a light split surface of said optical path split element.

3. The projection apparatus according to claim 2, wherein reflecting portions are formed in areas, corresponding to the focal positions of said plurality of lens elements, on the light split surface of said optical path split element, and the reflected light beams from said reflection type light valve are transmitted through areas different from the reflecting portions on the light split surface.

4. The projection apparatus according to claim 2, wherein transmitting areas are formed in portions, corresponding to the focal positions of said plurality of lens elements, on the light split surface of said optical path split element, and the reflected light beams from said reflection type light valve are reflected by areas different from the transmitting areas on the light split surface.

5. The projection apparatus according to claim 2, wherein an optical distance along the optical axis between the light split surface and said relay optical system and an optical distance along the optical axis between said relay optical system and the reflecting portion are equal to a focal length of said relay optical system.

6. The projection apparatus according to claim 5, wherein said plurality of lens elements are arranged in point-symmetric positions with respect to the optical axis.

7. The projection apparatus according to claim 5, wherein said plurality of lens elements are arranged in positions exclusive of the point-symmetric positions with respect to the optical axis.

8. The projection apparatus according to claim 1, wherein said optical path split element is disposed between said fly's eye lens and said relay lens.

9. A projection apparatus comprising:
   a light source;
   a fly's eye lens;
   a relay optical system;
   an optical path split element;
   a reflection type light valve; and
   an imaging optical system,
   wherein said relay optical system is disposed so that a normal line of said reflection type light valve is parallel to an optical axis of said relay optical system,
   said reflection type light valve and a screen are conjugate with respect to said imaging optical system, and
   light beams from said light source travel through said fly's eye lens, said optical path split element and said relay optical system and also, after being reflected by said reflection type light valve, travel through said relay optical system, said optical path split element and said imaging optical system.

10. The projection apparatus according to claim 9, wherein said fly's eye lens has a plurality of lens elements, and
   said plurality of lens elements are disposed so that focal positions of said plurality of lens elements are located on a light split surface of said optical path split element.

11. The projection apparatus according to claim 10, wherein an optical distance along the optical axis between the light split surface and said relay optical system and an optical distance along the optical axis between said relay optical system and the reflecting portion are equal to a focal length of said relay optical system.

12. A projection apparatus comprising:
   a reflection type light valve;
   a light source;
   a fly's eye lens disposed in light beams from said light source;
   a relay optical system having an optical axis parallel to a normal line of said reflection type light valve, for guiding the light beams emerging from said fly's eye lens to said reflection type light valve; and
   an imaging optical system through which said reflection type light valve is conjugate to a screen.

13. The projection apparatus according to claim 12, wherein the light beams emerging from said fly's eye lens but incident on said relay optical system are incident from a direction oblique to the optical axis of said relay optical system.

14. An illuminating system comprising:
   a light source;
   a fly's eye lens having a plurality of lens elements;
   an optical path split element having a light split surface disposed in focal positions of said plurality of lens elements; and
   a relay optical system,
   wherein an optical distance along the optical axis between the light split surface and said relay optical system and an optical distance along the optical axis between said relay optical system and an illuminated object are coincident with a focal length of said relay optical system, and
   only portions, corresponding to the focal positions of said plurality of lens elements, on the light split surface direct the light beams emerging from said fly's eye lens.

15. The illuminating system according to claim 14, wherein reflecting areas are provided in the areas, corresponding to the focal positions of said plurality of lens elements, on the light split surface of said optical path split element.

16. The illuminating system according to claim 14, wherein transmitting areas are provided in the portions, corresponding to the focal positions of said plurality of lens elements, on the light split surface of said optical path split element.

17. A detecting apparatus with an illuminating system, comprising:
   a light source;
   a fly's eye lens having a plurality of lens elements;
   an optical path split element having a light split surface disposed in focal positions of said plurality of lens elements;
   a relay optical system; and
   a detector,
   wherein an optical distance along the optical axis between the light split surface and said relay optical system and an optical distance along the optical axis between said relay optical system and an illuminated object are coincident with a focal length of said relay optical system,
   the light beams emerging from said fly's eye lens are directed by only portions, corresponding to the focal positions of said plurality of lens elements, on the light split surface, and
   reflected light beams from the illuminated object are directed by areas different from the portions on the light split surface and are guided to said detector.

18. The detecting apparatus with the illuminating system according to claim 17, wherein reflecting areas are provided in portions, corresponding to the focal positions of said plurality of lens elements, on the light split surface of said optical path split element, and
   the reflected light beams from the illuminated object are transmitted through the areas different from the portions on the light split surface.

19. The detecting apparatus with the illuminating system according to claim 17, wherein transmitting areas are provided in the portions, corresponding to the focal positions of said plurality of lens elements, on the light split surface of said optical path split element, and
   the reflected light beams from the illuminated object are reflected by the areas different from the transmitting areas on the light split surface.

* * * * *